Oct. 20, 1953 H. J. SHELTON, JR., ET AL 2,656,119
REFINING BLENDER
Filed Feb. 14, 1951 2 Sheets-Sheet 1

INVENTORS
HARRY J. SHELTON, JR.
BY LLOYD D. SMILEY
Alfred W. Peterha[?]
ATTORNEY

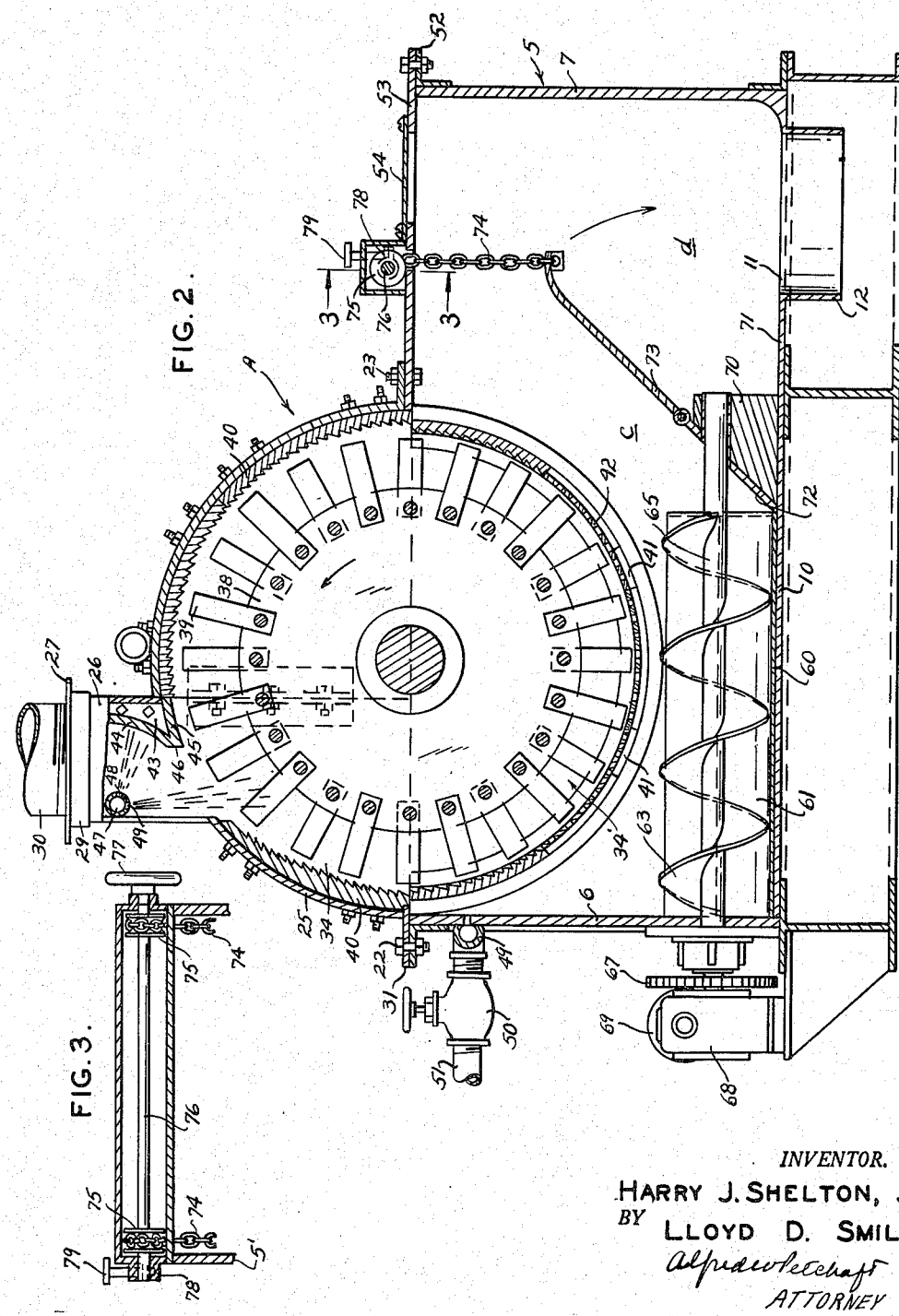

Patented Oct. 20, 1953

2,656,119

UNITED STATES PATENT OFFICE 2,656,119

REFINING BLENDER

Harry J. Shelton, Jr., Ladue, Mo., and Lloyd D. Smiley, Pensacola, Fla., assignors to Gruendler Crusher & Pulverizer Co., St. Louis, Mo., a corporation of Missouri Application February 14, 1951, Serial No. 210,929

4 Claims. (Cl. 241—46)

This invention relates in general to certain new and useful improvements in refining blenders and, more particularly, in machines of the hammermill type particularly adapted for reducing a liquids-solids mixture to a homogeneous slurry in which the solids are in finely divided form. At the present time it is necessary in many different types of industrial and commercial operations to reduce a liquids-solids suspension to a homogeneous slurry. For example, in many kinds of mining and milling operations ore particles must be broken up into finely divided state in a liquid medium to form a slurry which can be subsequently processed to separate valuable minerals from waste products. In other industrial supplies liquids which must be clarified by filtration with the employment of filter aids must be thoroughly intermixed with the filter aid before being fed into the filtration equipment. In the manufacture of paper pulp the partially disintegrated cellulosic fibers suspended in a suitable liquid medium must be broken down into homogeneous slurry in order to accomplish an efficient separation between the useful paper making fibers and non-paper making waste products. Furthermore, in many of these commercial operations it is also desirable to modify the size, length, and other physical characteristics of the solids or fibers contained in the slurry.

These are but a few examples of the various types of industrial operations requiring the formation of slurries in which the solids are thoroughly and finely disbursed throughout the liquid medium. Up to the present time it has been conventional practice to employ beaters of one type or another to accomplish this result, but beaters relate principally for their effectiveness upon continued agitation of the liquids-solids suspension in a manner which more nearly resembles stirring. Consequently, such operations are time consuming and are, in effect, batch processes.

Furthermore, a beater does not materially reduce particle size and cannot be said to homogenize the liquids-solids suspension being processed therein.

It is, therefore, the primary object of the present invention to provide a refining blender which is capable of reducing a liquids-solids suspension to a homogeneous slurry in which the solids content is in a finely divided state.

It is a further object of the present invention to provide a device of the type stated which is capable of homogenizing or changing the physical characteristics of liquids-solids suspension continuously and at a high rate of speed.

It is a further object of the present invention to provide a refining blender which is capable of homogenizing or changing the physical characteristics of heavy viscous slurries and expelling such slurries at a uniform and controlled rate without danger of binding or choking the machine.

It is an additional object of the present invention to provide a refining blender of the type stated which is simple and economical in construction and is rugged and durable so that maintenance and operating costs are held to a minimum and processing operations performed with it are extremely efficient in terms of cost per unit of material processed.

With the above and other objects in view, our invention resides in the novel features of form, construction, arrangement, and combination of parts presently described and pointed out in the claims.

In the accompanying drawings—

Figure 2 is a vertical sectional view taken along line 2—2 of Figure 1;

Figure 3 is a vertical sectional view taken along line 3—3 of Figure 2.

Figure 1:
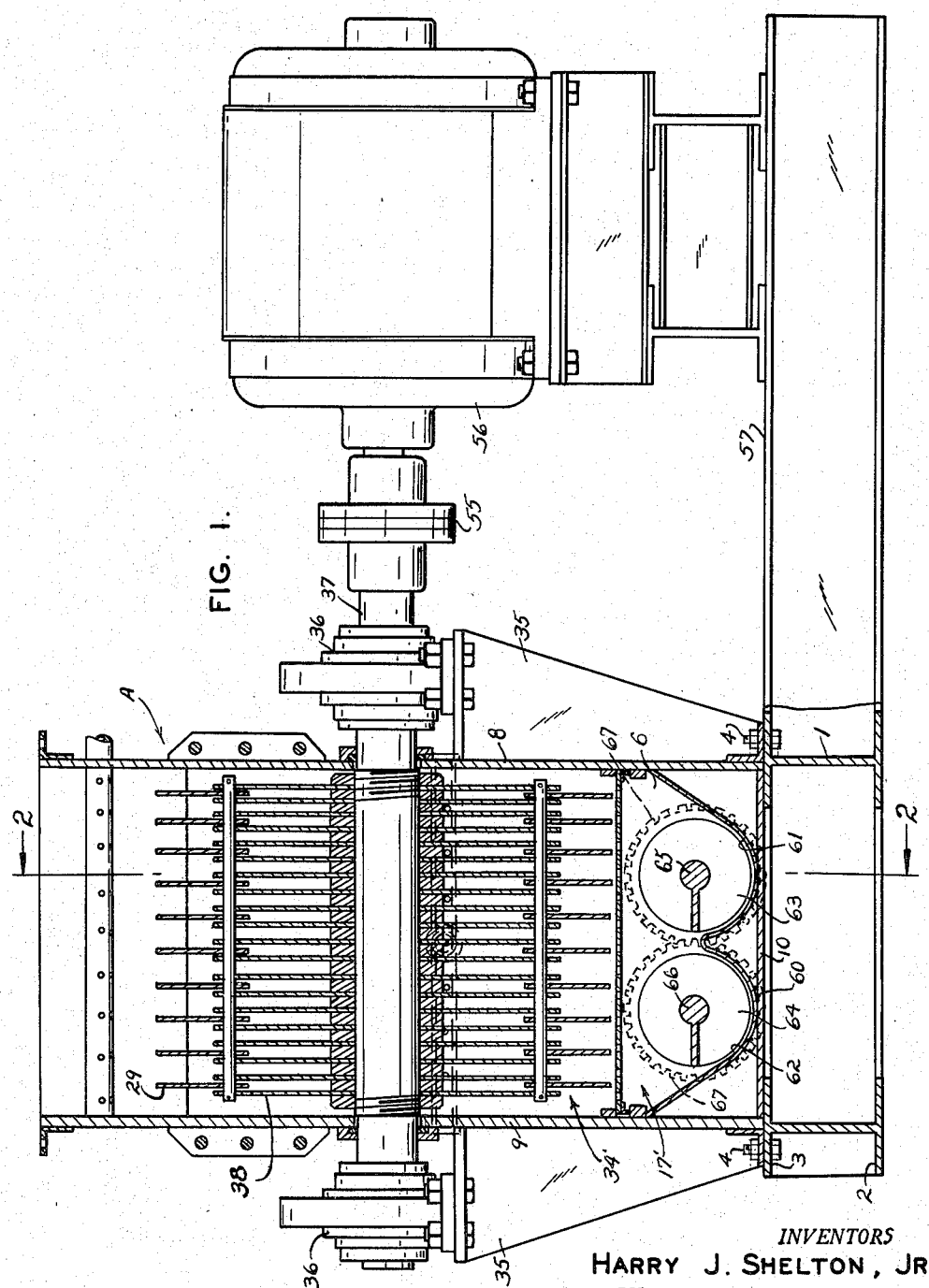
Figure 1 is a front elevational view, partly broken away and in section, of a refining blender constructed in accordance with and embodying the present invention.

Referring now in more detail and by reference characters to the drawings, which illustrate practical embodiments of the present invention, A designates a refining blender comprising an oblong-rectangular base casting 1 having a horizontally extending peripheral flange 2 adapted for securement in many conventional ways to a front or other supporting structure around its upper peripheral margin. The base casting 1 is provided with a narrow horizontal flange 3 and secured thereupon by means of bolts 4 is a housing shell 5 integrally including a rear wall 6, a front wall 7, side walls 8, 9, and a bottom wall 10, which extends more or less horizontally between the side walls 8, 9, and integrally joins the rear wall 6 and extends toward a discharge opening 11 formed adjacent the front wall 7. Formed integrally with the underface of the bottom wall 10 in concentric alignment with the discharge opening 11 is a discharge pipe 12.

Removably mounted upon the rear wall 6 by means of bolts 22, 23, is a semi-cylindrical cage top 25 having a radially offset vertical intake stack 26 terminating at its upper end in an integrally formed horizontal flange 27 forming part of an internally threaded circular pipe fitting 29 into which an intake pipe 30 is conventionally threaded. The cage top 25 is provided upon its inwardly presented peripheral margins with a continuous flange 31 for receiving the series of bolts 22, 23. It will be understood in this connection that a flange 31 is conventionally sealed to the upper margins of the shell 5 to provide a reasonable tight liquid proof seal therearound and thus form a somewhat cylindrical grinder cage 34.

Formed integrally with an extending laterally outwardly from the side walls 8, 9, are brackets 35, conventionally provided upon their upper faces with journal boxes 36 in which a conventional grinder shaft 37 is rotatably mounted. The grinder shaft 37 extends axially through the grinder cage 34 and along the interior portions of its length is provided with a plurality of spaced disks 38 which are, in turn, provided at uniformly spaced intervals around their periphery with a series of swing hammers 39. Bolted upon the interior face of the cage top 25 and extending around substantially the entire portion of its cylindrical face are serrated breaker plates 40 so dimensioned as to provide an appropriate degree of clearance between the ends of the swing hammers 39, substantially as shown in Figure 2. The portion of the shell 5 adjacent to the discharge opening 11 may be referred to as the discharge box d and the portion of the shell beneath the cage 34 may be referred to as the slurry chamber c.

Bolted or otherwise rigidly secured upon the interior faces of the side walls 8, 9, in concentric relation to the shaft 37 is a plurality of arcuate block elements or pads 41 for supporting a semi-cylindrical foraminous screen 42 which rests thereupon and is held in place by endwise abutment along its upper transverse margins against the inwardly presented transverse end faces of the lowermost breaker plates 40.

Bolted within the intake stack 26 against the forward transverse wall thereof is a lip-block 43 having an arcuate wall 44 having a rearwardly presented face which conforms to a gentle curve and is approximately tangent at its upper end to the forwardmost portion of the intake pipe 30 curving thence downwardly and forwardly to a point approximately midway across the intake stack 26 and closely adjacent to the upper limits of the hammer circle. The lip-block is also integrally provided with a transversely extending bottom wall 45 which conforms to the arc of the hammer circle. The rear wall 44 and the bottom wall 45 join integrally in the formation of a narrow lip 46 which extends horizontally and transversely across the intake stack 26 just at or above the upper limits of the hammer circle. It has been found that this arcuate contour of the wall 44 creates a so-called "venturi action" which improves the facility with which coarse or crude mixtures may be fed into the machine.

Also mounted in and extending transversely across the interior of the intake stack 26 adjacent the upper margin of the rear wall thereof is a spray pipe 47 conventionally connected to any source of water pressure (not shown) and provided with a plurality of spray openings 48, 49, so as to direct two distinct and separate sprays, one against the arcuate rear wall 44 and the other downwardly through the opening between the intake stack 26 and the grinder cage 34. Also mounted in the rear wall 6 just above the point of juncture of the bottom wall 10 is a pipe nipple 49 provided with a conventional water valve 50 which is, in turn, conventionally connected by a pipe line 51 to a source of water pressure (not shown). The shell 5 is provided around the upper peripheral margins of the discharge box d with a continuous horizontal flange 52 upon which is bolted a removable cover plate 53 and sheet metal housing 54 for providing convenient access to the interior of the discharge box d.

The shaft 37 is conventionally connected through a shaft coupling 55 to an electrical motor 56 which is, in turn, mounted on a conventional lateral extension 57 of the base casting 1 and is, in turn, conventionally connected to a source of electrical power (not shown).

The shell 5 is provided across its lowermost limits with a horizontal bottom wall 60 provided with two parallel longitudinally extending arcuate troughs 61, 62, in which are operatively mounted counter-rotating screw conveyor elements 63, 64, respectively, the latter having shafts 65, 66, respectively, projecting outwardly through the rear wall 6 for conventional driving connection through gears 67 and speed reducer 68 to an electrical motor 69. The forward or inwardly disposed ends of the shafts 65, 66, are journaled in a bearing block 70 mounted upon a horizontal bottom plate 71 and more or less in downwardly spaced vertical alignment with the front limit of the grinder cage 34. The bearing block 70 has a rearwardly presented inclined face 72 and hingedly mounted at its lower end thereupon is an inclined weir-plate or dam 73 which is connected at its upper end by a pair of upwardly extending chains 74 to an adjustment pulley 75 mounted on a shaft 76 which is, in turn, manipulated by a hand wheel 77. One end of the shaft 76 extends conventionally through a split bearing 78 which is adapted to be tightened down by a locking bolt 79 so that the shaft 76 can be held securely in any desired position of adjustment. By this means the height and angle of inclination of the weir-plate 73 may be suitably adjusted within reasonable limits. By reference to Figure 2 it will be noted that the weir-plate 73 terminates at its upper transverse margins in rearwardly spaced relation to the front wall 7 of the shell 5 so as to define the region of demarcation between the discharge chamber d and the slurry chamber c.

In use and operation, a liquids-solids mixture is fed into the grinder cage 34 through the intake pipe 30 and intake pipe 26 being sluiced downwardly and broken up to some extent by the high pressure sprays emanating from the spray apertures 48, 49. The incoming suspension is then impacted by the swing hammers 39 and thoroughly beaten into the liquid until it passes through the screen 42. As will be observed by reference to Figure 2, the weir plate 73 maintains a level of slurry within the slurry chamber c so that the swing hammers will run immersed during travel along the lowermost portion of their arc and the disintegrating action will thus continue in the slurry. Meanwhile, as the suspension continues to be fed into the grinder cage the slurry will build up in the slurry chamber c and will overflow the weir plate 73 at a rate approximately equal to the rate of infeed, so that, when the device is brought up to full scale operation, homogenized slurry will flow outwardly through the discharge pipe 12 at approximately the same rate of flow as that of the infeed. By adjusting the rate of infeed and the height of the weir plate 73, it is possible to vary the rate of flow through the refining blender A and the degree of fineness of the solids of the discharged slurry. By raising the level of the weir plate 73 and cutting down the rate of infeed, it is possible to form slurries having extremely finely disintegrated solids content. On the other hand, where a relatively coarse slurry is acceptable and a maximum rate of output is desired, the rate of infeed may be suitably increased and the height of the weir plate 73 lowered accordingly. It should, of course, be noted in this connection that at no time should the weir plate 73 be lowered below a point slightly higher than the lowest limits of the hammer circle, otherwise the hammers will not run immersed and homogenizing action will be materially impaired.

In dealing with extremely heavy materials it has been found that the liquids-solids suspension which is held at a relatively deep level within the slurry chamber c can be thoroughly homogenized and propelled from the bottom forwardly and upwardly under the weir-plate 73 into the discharge chamber d and thence outwardly through the discharge pipe 12 for further processing or handling. By use of the counter-rotating screw conveyors it becomes possible to handle and thoroughly homogenize relatively heavy liquids-solids suspension and achieve exceedingly satisfactory results continuously at a high rate of output.

It should be understood that changes and modifications in the form, construction, arrangement, and combination of the several parts of the refining blender may be made and substituted for those herein shown and described without departing from the nature and principle of our invention.

Having thus described our invention, what we claim and desire to secure by Letters Patent is—

1. In a refining blender having a housing provided in its lower portion with a slurry chamber and in its upper portion with a cage-forming chamber, a rotative shaft extending through said cage-forming chamber and being provided with a plurality of swing hammers, an arcuate screen separating the cage-forming chamber from the slurry chamber; the improvement comprising means for controlling the consistency and degree of disintegration of the outflowing material, said means including a screw conveyor extending horizontally across the bottom portion of the slurry chamber, said screw conveyor including a shaft having an inwardly disposed end, a bearing block mounted within the slurry chamber for operatively supporting the inner end of said shaft, said bearing block having an oblique face presented toward the screw conveyor and extending angularly upwardly and outwardly away from the screw conveyor, an obliquely inclined dam hingedly mounted upon the upper end of the bearing block and positioned to form a continuation surface upwardly and beyond the inclined face of the bearing block, and means for adjustably swinging the hinged dam to any desired angular position within maximum and minimum limits, for maintaining the level of slurry within the slurry chamber so that slurry will extend upwardly into the cage-forming chamber so that the upper portion of the slurry will be subjected to the action of the swing hammers and the lower portion of the slurry will be progressively propelled transversely across the slurry chamber onto and upwardly across the face of the dam and then discharged from the slurry chamber.

2. In a refining blender having a housing provided in its lower portion with a slurry chamber and in its upper portion with a cage-forming chamber, a rotative shaft extending through said cage-forming chamber and being provided with a plurality of swing hammers, and an arcuate screen separating the cage-forming chamber from the slurry chamber; the improvement comprising means for controlling the consistency and degree of disintegration of the outflowing material, said means including a member mounted in the slurry chamber and having an upwardly inclined face extending from the bottom of the slurry chamber upwardly and away from the axis of rotation of the swing hammers, the lower portion of the inclined face being located between the vertical center line of the cage and the vertical tangential plane of the upswinging side of the hammer circle, hinge means operatively mounted on said member along a line substantially parallel to the axis of rotation of the shaft, and an obliquely inclined flat dam operatively mounted on the hinge means and extending angularly upwardly and outwardly so that its upper margin is spaced laterally with respect to the cage-forming chamber and upwardly with respect to the bottom of the slurry chamber for maintaining a liquid level therein which extends upwardly through the lower portion of the screen and lies within the cage-forming chamber.

3. In a refining blender having a housing provided in its lower portion with a slurry chamber and in its upper portion with a cage-forming chamber, a rotative shaft extending through said cage-forming chamber and being provided with a plurality of swing hammers, and an arcuate screen separating the cage-forming chamber from the slurry chamber; the improvement comprising means for controlling the consistency and degree of disintegration of the outflowing material, said means including a member mounted in the slurry chamber and having an upwardly inclined face extending from the bottom of the slurry chamber upwardly and away from the axis of rotation of the swing hammers, the lower portion of the inclined face being located between the vertical center line of the cage and the vertical tangential plane of the upswinging side of the hammer circle, hinge means operatively mounted on said member along a line substantially parallel to the axis of rotation of the shaft, an obliquely inclined flat dam operatively mounted on the hinge means and extending angularly upwardly and outwardly so that its upper margin is spaced laterally with respect to the cage-forming chamber and upwardly with respect to the bottom of the slurry chamber for maintaining a liquid level therein which extends upwardly through the lower portion of the screen and lies within the cage-forming chamber, and means for adjustably swinging the hinged dam to any desired angular position within maximum and minimum limits.

4. In a refining blender having a housing provided in its lower portion with a slurry chamber and in its upper portion with a cage-forming chamber, a rotative shaft extending through said cage-forming chamber and being provided with a plurality of swing hammers, and an arcuate screen separating the cage-forming chamber from the slurry chamber; the improvement comprising means for controlling the consistency and degree of disintegration of the outflowing material, said means including a member mounted in the slurry chamber and having an upwardly inclined face extending from the bottom of the slurry chamber upwardly and away from the axis of rotation of the swing hammers, the lower portion of the inclined face being located between the vertical center line of the cage and the vertical tangential plane of the upswinging side of the hammer circle, hinge means operatively mounted on said member along a line substantially parallel to the axis of rotation of the shaft, an obliquely inclined flat dam operatively mounted on the hinge means and extending angularly upwardly and outwardly so that its upper margin is spaced laterally with respect to the cage-forming chamber and upwardly with respect to the bottom of the slurry chamber for maintaining a liquid level therein which extends upwardly through the lower portion of the screen and lies within the cage-forming chamber, means for adjustably swinging the hinged dam to any desired angular position within maximum and minimum limits, and a screw conveyor extending horizontally across the bottom portion of the slurry chamber transversely with respect to the shaft and having its discharge end located adjacent to the lower portion of the dam for propelling slurry transversely across the slurry chamber up over the dam.

HARRY J. SHELTON, Jr.
LLOYD D. SMILEY.

References Cited in the file of this patent

UNITED STATES PATENTS

| Number | Name | Date |
|---|---|---|
| 647,336 | Sulman | Apr. 10, 1900 |
| 1,239,286 | Marcy | Sept. 4, 1917 |
| 1,485,416 | Keller | Mar. 4, 1924 |
| 1,785,840 | Munroe | Dec. 23, 1930 |
| 2,025,841 | Young | Dec. 31, 1935 |
| 2,036,168 | Engert | Mar. 31, 1936 |
| 2,189,518 | Gschwender et al. | Feb. 6, 1940 |
| 2,199,729 | Peterson | May 7, 1940 |